United States Patent
Friend

(10) Patent No.: US 7,694,146 B2
(45) Date of Patent: Apr. 6, 2010

(54) LOGIN SECURITY DAEMON

(75) Inventor: Doug Friend, St. Bruno (CA)

(73) Assignee: 3501256 Canada, Inc., St. Bruno, Quebec (CA)

( * ) Notice: Subject to any disclaimer, the term of this patent is extended or adjusted under 35 U.S.C. 154(b) by 809 days.

(21) Appl. No.: 11/601,270

(22) Filed: Nov. 18, 2006

(65) Prior Publication Data

US 2008/0120719 A1    May 22, 2008

(51) Int. Cl.
    G06F 21/00    (2006.01)
(52) U.S. Cl. ................... 713/182; 713/183; 726/6; 726/22
(58) Field of Classification Search .................. 713/182
    See application file for complete search history.

(56) References Cited

U.S. PATENT DOCUMENTS

| | | | |
|---|---|---|---|
| 5,991,881 A | 11/1999 | Conklin et al. | |
| 6,405,318 B1 | 6/2002 | Rowland | |
| 6,938,167 B2 | 8/2005 | Roskind | |
| 2003/0220879 A1* | 11/2003 | Gaughan et al. | .............. 705/51 |
| 2004/0068559 A1 | 4/2004 | Shaw | |
| 2004/0093387 A1 | 5/2004 | Wick | |

* cited by examiner

*Primary Examiner*—Gilberto Barron, Jr.
*Assistant Examiner*—Cordelia Kane
(74) *Attorney, Agent, or Firm*—Gene Scott; Patent Law & Venture Group

(57) ABSTRACT

A method embodied in a daemon resident on a server provides for notification of a client when a new session is initiated with respect to the client's private account. Assuming that a user is able to log onto the server and gain access to the client's account, the daemon checks if the client has requested notification and if so, formats e-mail alerts and distributes them to requested e-mail addresses on, for instance, local computers, cell phones, PDA and other receivers of e-mail traffic. Should the client discover, by receiving one of these e-mails that an impostor client has gained access to the client's account, the daemon is able to close down the sessions selected by the client and cancel the current password in favor of a temporary new password available only to the client.

5 Claims, 4 Drawing Sheets

LOGIN SECURITY DAEMON

BACKGROUND OF THE INVENTION

1. Field of the Present Disclosure

Figure 1A:
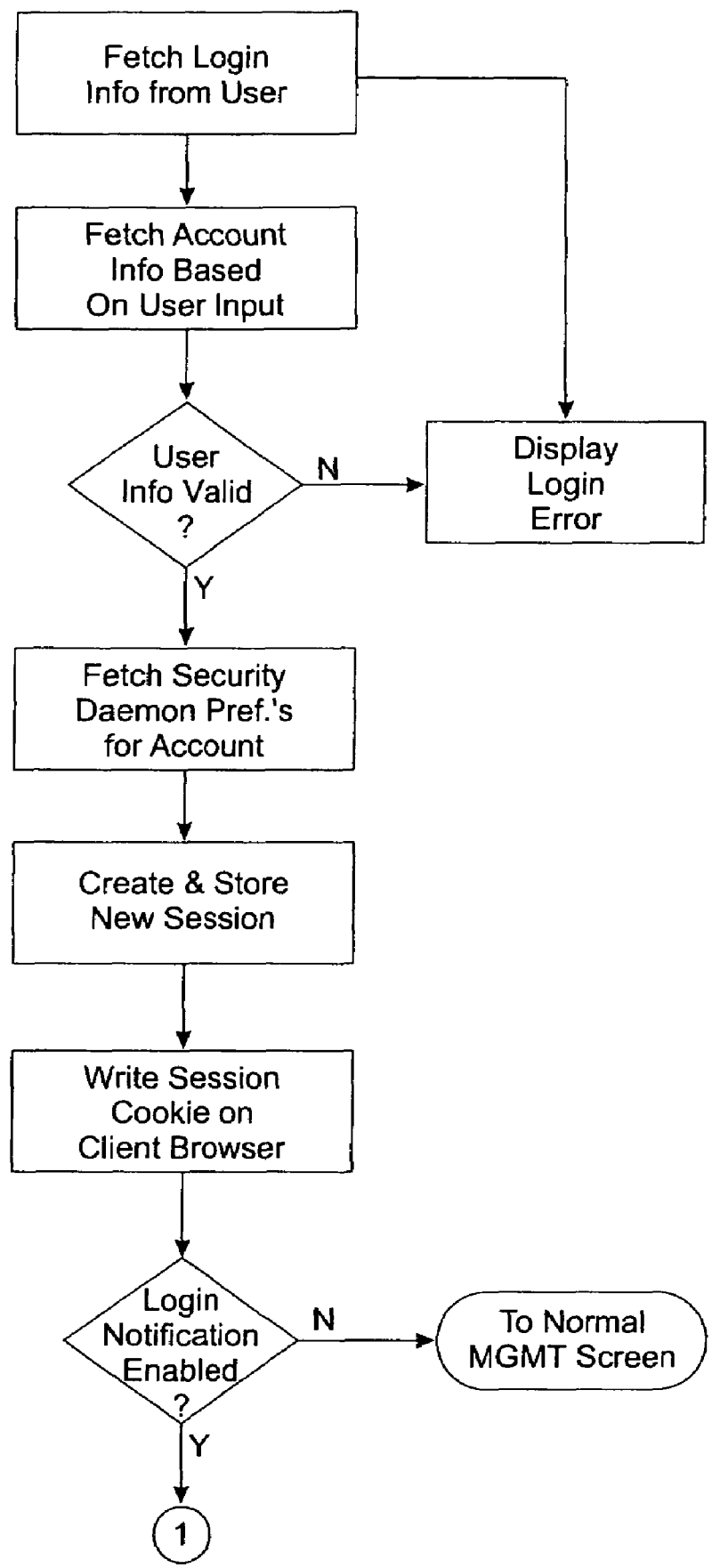

This disclosure relates generally to computer operations network security and relates to client accounts resident on remote servers where such accounts are accessible remotely by password. The disclosure further relates to a daemon capable of notifying a client of access actions on his/her account and of taking actions to close down unauthorized sessions and change password access.

2. Description of Related Art Including Information Disclosed Under 37 CFR 1.97 and 1.98

In Unix and other computer multitasking operating systems a daemon is a computer program that runs in the background, rather than under the direct control of a user; they are usually instantiated as processes. Typically daemons have names that end with the letter "d"; for example, syslogd is the daemon which handles the system log. Daemons typically do not have any existing parent process, but resides directly under init in the process hierarchy. Daemons usually become daemons by forking a child process and then making the parent process kill itself, thus making init adopt the child. This practice is commonly known as "fork off and die." Systems often start (or "launch") daemons at boot time: they often serve the function of responding to network requests, hardware activity, or other programs by performing some task. Daemons can also configure hardware, run scheduled tasks, and perform a variety of other tasks. In a strictly technical sense, Unix recognizes as a daemon any process that has process number 1 (init) as its parent process. The init process adopts any process whose parent dies without waiting for the child's status, so the common method for launching a daemon involves forking once or twice, and making the parent (and possibly the grandparent) die while the child (or grandchild) process begins performing its normal function. In common Unix usage a daemon may be any background process, whether a child of init or not. UNIX users sometimes spell daemon as demon, and most usually pronounce the word that way. In the DOS environment, such programs were written as terminate and stay resident (TSR) software. On Microsoft Windows systems, programs called "services" perform the functions of daemons, though the term "daemon" has started to creep into common usage on that platform as well. On the original Mac OS similar systems were known as extensions. Mac OS X being a unix-like system, has daemons also but these are different in concept.

Shaw, 20040068559, discloses a method for detecting unauthorized computer system usage, and monitors the subscriber's activities while using the computer system, the system activities and the Internet activities. When the computer system is initialized, the subscriber may manually or automatically set parameters for determining when an activity is unauthorized. When an activity is detected with deviates from normal system usage and operation, the activity is unauthorized. The unauthorized activity may be recorded in an activity log, may be terminated by the computer system, or the subscriber may be notified of the unauthorized usage.

Wick, 20040093387, discloses communicating with and/or monitoring of a target used in computer-network environment (e.g., an instant messaging system) involving detecting that the targeted user has signed on to the network, and upon detecting the sign-on, automatically communicates with the targeted user, for example, by sending a previously specified instant message. Alternatively, or in addition, the targeting user can receive notification that the targeted user has signed on and/or that the instant message has been sent. Instead of, or in addition to, automatically sending an instant message and/or notifying the targeting user, a predefined operation specified by the targeting user (e.g., operating system command, script or executable file) can be performed. These various operations can be performed on one or more client systems, on one or more server systems, or any combination thereof.

Conklin, et al, U.S. Pat. No. 5,991,881, discloses a system and method for network surveillance and detection of attempted intrusions, or actual intrusions, into the network and into computers connected to the network. The System functions include: intrusion detection monitoring, real-time alert, logging of potential unauthorized activity, and incident progress analysis and reporting. Upon detection of any attempts to intrude, the System will initiate a log of all activity between the computer elements involved and send an alert to a monitoring console. When a log is initiated, the network continues to be monitored by a primary surveillance system. A secondary monitoring process is started which interrogates the activity log in real-time and sends additional alerts reporting the progress of the suspected intruder.

Roskind, U.S. Pat. No. 6,938,167, discloses a technique for defining a system with enhanced trust, in which an immediate contact is made with the user on the enhanced trust system when a compromise is first detected, e.g. when there is a second log in attempt from another location. Using these communications channels, the service can often contact the compromised user and ask for confirmation of the results, i.e. to change password or login, from a reduced trust machine. As a result, even if an attacker steals a password, the true user on the enhanced trust machine is able to preclude a login or preclude a password change. In each case, if the user of the enhanced trust machine does not respond within some short period of time, then a less trusted machine can be allowed to proceed. The invention comprehends two definitions of an enhanced trust machine. In a first embodiment of the invention, an enhanced trust machine is a machine where the user is currently logged in at the time that the second, less trusted machine attempts a login. A second embodiment of the invention comprehends an enhanced trust machine where the user has logged in repeatedly over a course of numerous weeks, as compared with a lesser trusted machine that the user has never logged into before and which is now asking for a change of the password. In this case, the system may or may not find the less trusted machine to be just that based on actions that are experientially inconsistent with what is expected.

Rowland, U.S. Pat. No. 6,405,318, discloses a computer-implemented intrusion detection system and method that monitors a computer system in real-time for activity indicative of attempted or actual access by unauthorized persons or computers. The system detects unauthorized users attempting to enter into a computer system by comparing user behavior to a user profile, detects events that indicate an unauthorized entry into the computer system, notifies a control function about the unauthorized users and events that indicate unauthorized entry into the computer system and has a control function that automatically takes action in response to the event. The user profiles are dynamically constructed for each computer user when the computer user first attempts to log into the computer system and upon subsequent logins, the user's profile is dynamically updated. By comparing user behavior to the dynamically built user profile, false alarms are reduced. The system also includes a log auditing function, a port scan detector and a session monitor function.

The related art described above discloses several systems and methods for identification of unauthorized access and notification of a valid user. However, the prior teaches the monitoring of a users system, an instant messaging network, network intrusions in a computer network environment, and identifying only access coming from a foreign Internet address, The present method distinguishes in that it is directed to a client account and provides for remedial actions. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The present invention is a method embodied in a daemon resident on a server that provides for notification of a client when a new session is initiated with respect to the client's private account. Assuming that a user is able to log onto the server and gain access to the client's account, the daemon program on the server checks if the client has requested notification and if so, formats e-mail alerts and distributes them to requested e-mail addresses on, for instance, local computers, cell phones, PDA and other receivers of e-mail traffic. Should the client discover, by receiving one of these e-mails that an impostor client has gained access to the client's account, the daemon is able to close down the sessions selected by the actual client and cancel the current password in favor of a temporary new password only available to the true client.

A primary objective inherent in the above described method of use is to provide advantages not taught by the prior art.

Another objective is to provide such a method that provides for notification to a client whenever a new session is opened in his/her account.

A further objective is to provide such a method that enables the client to receive notification of such new account activity at a plurality of addresses both over the Internet and via instant messaging.

A still further objective is to provide such a method that enables a client to shut down unauthorized activity or sessions in the client' account.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Figure 1B:
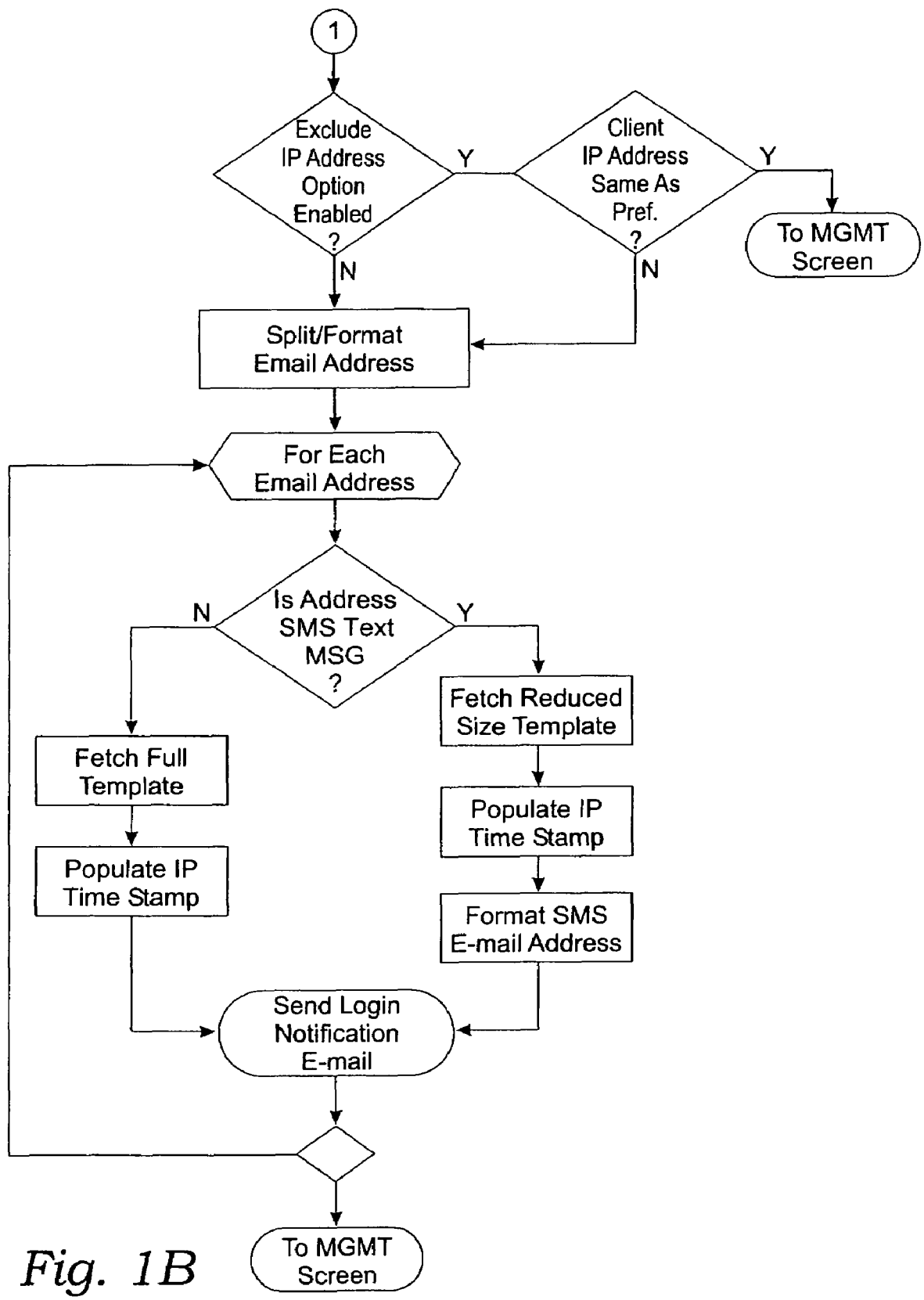
Figure 2A:
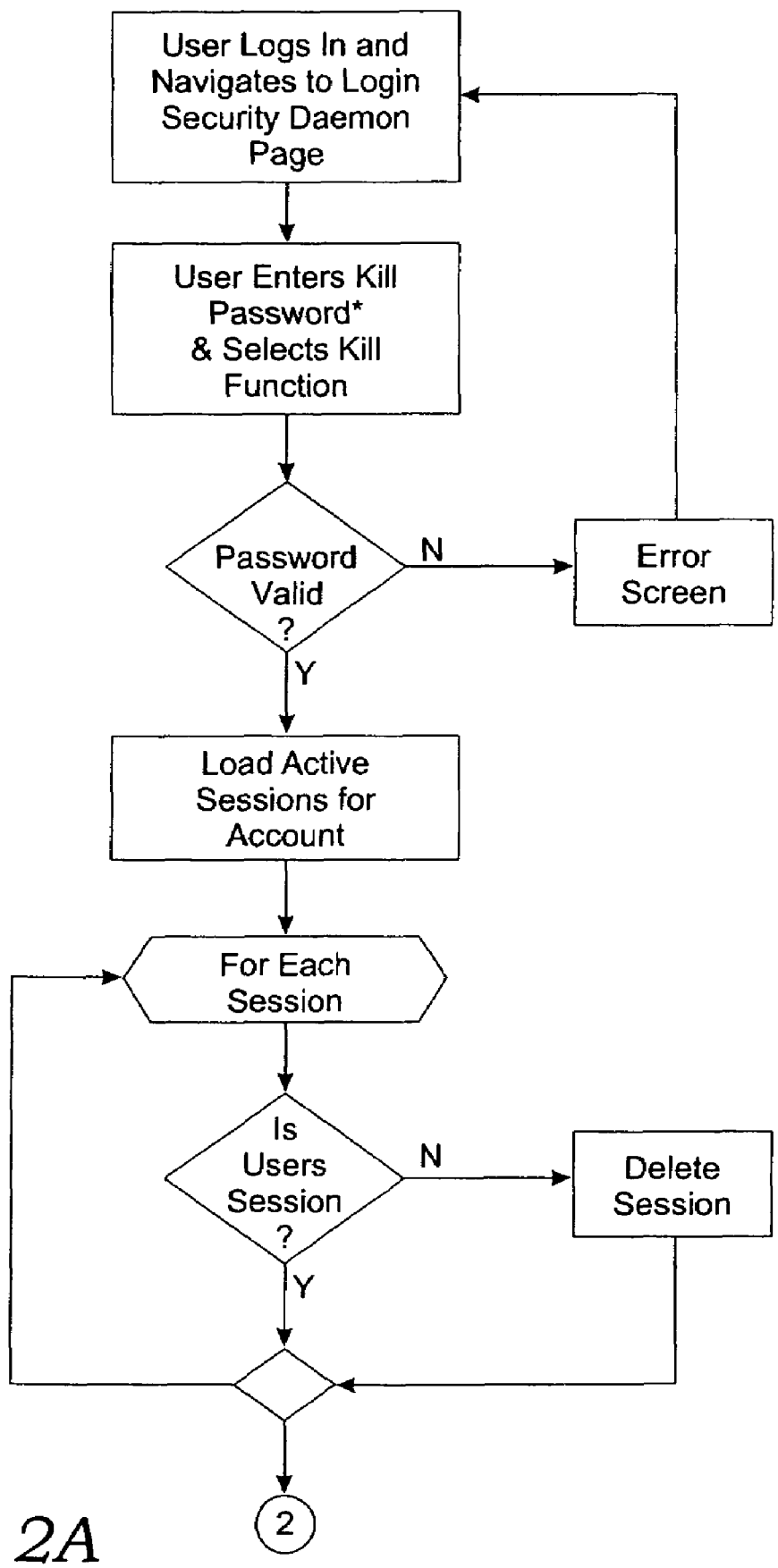
Figure 2B:
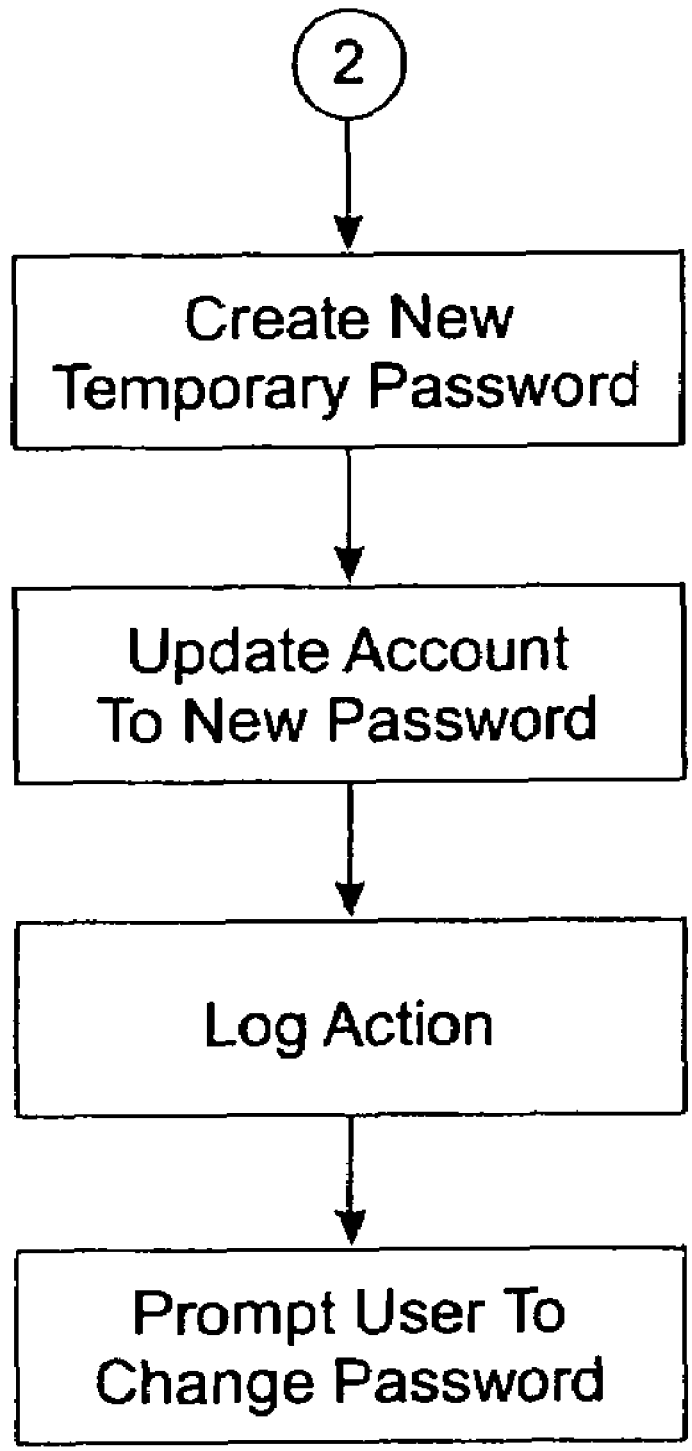

Illustrated in the accompanying drawing(s) is at least one of the best mode embodiments of the present invention In such drawing(s):

FIGS. 1A and 1B form a flow diagram illustrating the steps of that part of the present method enabling a client to determine if an invalid session is occurring with respect to the client's account; and FIGS. 2A and 2B form a further flow diagram illustrating the steps of that part of the present method enabling the client to take remedial action.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

Described now in detail is a method for enhanced online account security for a client account during the operation of a server communicating with the client, typically via the Internet or through wireless communications (the Cell network, etc.), on a means for displaying information, such as a monitor screen, a cell phone, PDA, etc. This method is conducted in certain steps including the step of enabling the client to log onto a web site designed for enabling the present method. During logon, a daemon program operating on the server tests the client's login information against an account information of the client's account which is stored in a server memory. A login error message is displayed if logon failure occurs. Next, security daemon preferences are fetched for the client's account and a new session cookie is written to the client's browser. Following this, testing determines if login notification is enabled for this client and if it is found that it is not enabled, an account management screen is displayed to the client so that the client may conduct his/her business in the client account. Testing also determines if an exclude IP address option is enabled, and if it is then testing of the client's IP address relative to this particular logon, equals a daemon preference client IP address stored in memory, and if results of this testing is positive, the management screen is enabled to the client. If the exclude IP address option is not enabled, or if a match between client IP address and daemon preference IP address fails, splitting and formatting of client's email addresses is carried out. Then for each of the client's email addresses, a login notice is automatically prepared with the e-mail message adapted for regular email or for Short Message Service (SMS) as the case may be, in accordance with testing for this distinction, as is well known in this art. The e-mail messages are next populated with an IP address of the login session and time stamp of the login. Then e-mail notifications are sent and the management screen is displayed, i.e., security notifications have been sent and it is now up to the client to detect that an unauthorized user has gained access to his/her account.

Once the client is notified, he/she has an opportunity to kill unauthorized activities. The present method provides an opportunity for entering a kill password and selecting a kill function from the management screen. Next, the client validates with a kill password, and all currently active sessions are loaded for the client's account. The client is then able to delete those active sessions that are not valid, and a new temporary password is automatically created and the account is updated to the new temporary password. This has the effect of terminating the intruder's session and eliminating the possibility of the intruder regaining access, i.e., opening a new session by logging back into the account. The client is then prompted to change the temporary password to a new password.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A method for enhanced online account security for an account of a client, in the operation of a server communicating with a means for displaying information to the client, the method comprising the steps of:
    a) testing a login information against an account information of the account;
    b) fetching security daemon preferences for the account;
    c) writing a new session cookie on a browser of the client;
    d) testing if login notification is enabled;
    e) testing if an exclude IP address option is enabled;
    f) testing if a client IP address equals a daemon preference client IP address;
    g) splitting and formatting a client e-mail address list;
    h) for each e-mail address:
        i) testing the e-mail address for Short Message Service;
        ii) selecting and fetching one of: a full size template and a reduced size template depending on the outcome of step (i);
        iii) populating the selected template with an IP time stamp;
        iv) formatting the e-mail message for Short Message Service when the reduced size template is used;
        v) sending login notification e-mail message; and
    j) displaying the management screen.

2. The method of claim 1 further comprising the step of displaying a login error message upon testing failure of step (a).

3. The method of claim 1 further comprising the step of displaying a management screen upon testing failure of step (d).

4. The method of claim 1 further comprising the step of displaying a management screen upon testing success at step (f).

5. The method of claim 1 further comprising the steps of:
    a) entering a kill password and selecting a kill function from the management screen;
    b) validating the kill password;
    c) loading active sessions for the account;
    d) for each of the active sessions, delete those sessions that are not client sessions;
    e) create new temporary password;
    f) update account to the new temporary password; and
    g) prompt client to change temporary password.

* * * * *